US012707204B2

(12) United States Patent
Oki

(10) Patent No.: US 12,707,204 B2
(45) Date of Patent: Aug. 11, 2026

(54) SPEAKER THAT VIBRATES DIAPHRAGM

(71) Applicant: JVCKENWOOD Corporation, Yokohama (JP)

(72) Inventor: Jun Oki, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 149 days.

(21) Appl. No.: 18/885,891

(22) Filed: Sep. 16, 2024

(65) Prior Publication Data

US 2025/0008271 A1 Jan. 2, 2025

Related U.S. Application Data

(63) Continuation of application No. PCT/JP2022/035058, filed on Sep. 21, 2022.

(30) Foreign Application Priority Data

Mar. 17, 2022 (JP) ................................ 2022-042783

(51) Int. Cl.
*H04R 9/04* (2006.01)
*H04R 9/02* (2006.01)
*H04R 9/06* (2006.01)

(52) U.S. Cl.
CPC ............ *H04R 9/046* (2013.01); *H04R 9/025* (2013.01); *H04R 9/043* (2013.01); *H04R 9/06* (2013.01); *H04R 2400/11* (2013.01)

(58) Field of Classification Search
CPC ........ H04R 9/046; H04R 9/025; H04R 9/043; H04R 9/06; H04R 2400/11; H04R 9/04; H04R 1/06
See application file for complete search history.

(56) References Cited

FOREIGN PATENT DOCUMENTS

| | | | |
|---|---|---|---|
| JP | 2007251285 A | | 9/2007 |
| JP | 2010288100 | * | 12/2010 |

OTHER PUBLICATIONS

International Preliminary Report on Patentability from International Application No. PCT/JP2022/025058 mailed Sep. 10, 2024, 8 pages.
International Search Report from International Application No. PCT/JP2022/03058 mailed Dec. 13, 2022, 4 pages.

* cited by examiner

*Primary Examiner* — Tuan D Nguyen
(74) *Attorney, Agent, or Firm* — Shih IP Law Group, PLLC

(57) ABSTRACT

A speaker includes at least a terminal plate, a vibration unit, a tinsel wire, and an elastic member. Among these, the vibrating unit includes a voice coil and a diaphragm. The tinsel wire connects the terminal plate and the voice coil. The elastic member is set at a position where the elastic member becomes deformed due to movement stress generated at the tinsel wire in response to vibration of the vibration unit when excessive current exceeding a predetermined current range is input to the voice coil via the tinsel wire. Such an elastic member becomes deformed due to the movement stress generated at the tinsel wire in response to the vibration of the vibration unit.

4 Claims, 6 Drawing Sheets

200

200

SPEAKER THAT VIBRATES DIAPHRAGM

CROSS-REFERENCE TO RELATED APPLICATION

This application is based upon and claims the benefit of priority from the prior Japanese Patent Application No. 2022-042783, filed on Mar. 17, 2022, the entire contents of which is incorporated herein by reference.

BACKGROUND

1. Technical Field

The present disclosure relates to a speaker and particularly to a speaker that vibrates a diaphragm.

2. Description of the Related Art

A speaker includes a frame, a vibration unit attached to the frame, a magnetic circuit unit attached to the frame, and a terminal board attached to the frame. In the speaker, an audio current is supplied to the voice coil of the vibrating unit, and the voice coil vibrates the diaphragm in cooperation with the magnetic circuit unit in response to the audio current, thereby generating sound corresponding to the audio current from the diaphragm. In such a speaker, it is desirable to suppress the generation of abnormal noise caused by contact between the tinsel wire and the frame. Therefore, for example, a buffer member is provided (for example, Patent Document 1).

[Patent Document 1] Japanese Patent Application Publication No. 2007-251285

If input exceeding the maximum input of the speaker is input from the amplifier side, the tinsel wire may become taut when the diaphragm protrudes in the direction in which the speaker emits sound. If the voice coil is pulled when the tinsel wire becomes taut causing the voice coil to be tilted, friction occurs between the voice coil and the magnetic circuit, which may lead to disconnection or destruction.

SUMMARY

A speaker according to an embodiment includes: a terminal plate; a vibration unit that includes a voice coil and a diaphragm; a tinsel wire that connects the diaphragm and the voice coil; and an elastic member that is placed at a position where the elastic member becomes deformed due to movement stress generated at the tinsel wire in response to vibration of the vibration unit when excessive current exceeding a predetermined current range is input to the voice coil via the tinsel wire. The elastic member becomes deformed due to the movement stress generated at the tinsel wire in response to the vibration of the vibration unit.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

The invention will now be described by reference to the preferred embodiments. This does not intend to limit the scope of the present invention, but to exemplify the invention.

A brief description of the present disclosure will be given first before a specific description thereof is given. An exemplary embodiment of the present disclosure relates to a speaker that outputs sound by vibrating a diaphragm with a voice coil. The voice coil of a vibration system and a terminal plate provided on the frame are connected by a tinsel wire. Generally, the tinsel wire is placed between the diaphragm and the damper of the vibration system. The tinsel wire has a length suitable for the speaker specifications (maximum input of the speaker and maximum amplitude expected). If the tinsel wire is too short, the tinsel wire becomes taut before the expected amplitude is reached, limiting the vibration of the diaphragm. If the tinsel wire is too long, the tinsel wire comes into contact with the vibration system due to the deflection of the tinsel wire itself, causing abnormal sound. These prevent the speaker from performing the basic functions. For this reason, the length of the tinsel wire is not set too short but is set to a length that is not too long with a little margin.

As described above, when input exceeding the maximum input of the speaker is input from the amplifier side, in other words, when the vibration system including the voice coil has an amplitude greater than an expected range, it is considered that the length of the tinsel wire is insufficient for the amplitude and that the tinsel wire becomes taut first when the diaphragm protrudes. At this time, friction occurs between the voice coil and the magnetic circuit due to the tautening of the tinsel wire causing the voice coil to be pulled and the voice coil to tilt, which may lead to disconnection or destruction. It is required to suppress the occurrence of disconnection of the voice coil due to the tautening of the tinsel wire at the time of excessive input. In the speaker according to the present exemplary embodiment, a shrinkable elastic member is arranged around the tinsel wire connecting the terminal plate and the voice coil. The elastic member shrinks when the tinsel wire is being taut, causing the tinsel wire to stretch virtually. On the other hand, the tinsel wire is placed in the normal position when the tinsel wire does not become taut, and the tinsel wire has the set length during a downward stroke.

Figure 1:
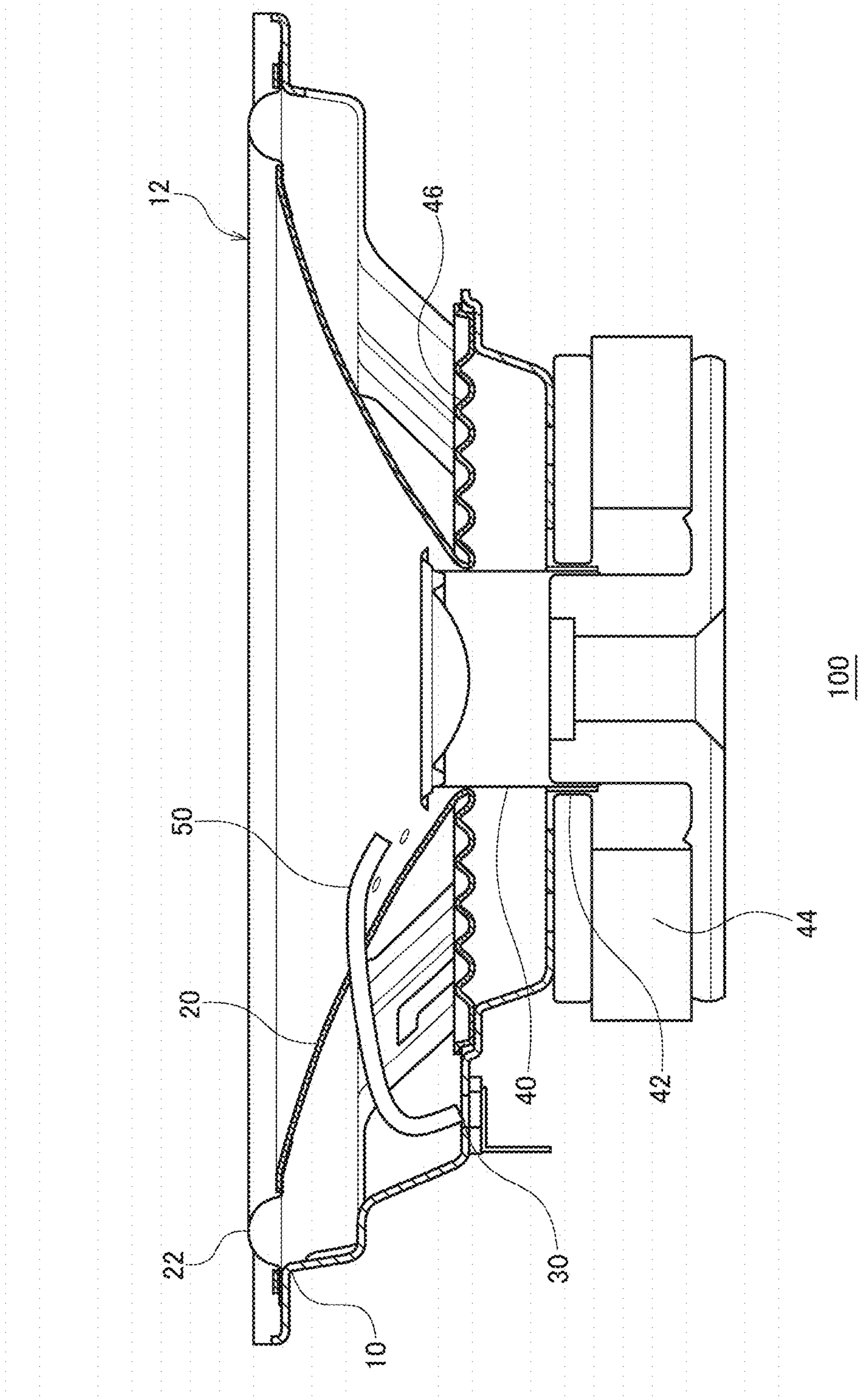
FIG. 1 is a cross-sectional view showing the structure of a speaker to be compared in the present exemplary embodiment.

FIG. 1 is a cross-sectional view showing the structure of a speaker 100 to be compared in the present exemplary embodiment. The speaker 100 includes a frame 10, a diaphragm 20, an edge 22, a terminal plate 30, a voice coil bobbin 40, a voice coil 42, a magnetic circuit 44, a damper 46, and a tinsel wire 50.

The frame 10 has a bowl-shaped shape and has an opening 12 in the upper portion. Further, the bottom portion of the frame 10 is also open, and the magnetic circuit 44 is attached to the bottom portion. The magnetic circuit 44 includes a magnet. The magnetic circuit 44 may include a pot yoke and a top plate. In the present exemplary embodiment, the upper side refers to the sound emission direction of the speaker 100, and the lower side refers to the direction opposite to the sound emission direction of the speaker 100. These directions are common in the following explanation.

The voice coil bobbin 40 is a cylindrical tube, and the voice coil 42 is wound around the voice coil bobbin 40. The voice coil 42 vibrates the voice coil bobbin 40 in cooperation with the magnetic circuit 44. Further, the diaphragm 20 and the damper 46 are connected to the voice coil bobbin 40. The diaphragm 20 vibrates in accordance with the voice coil bobbin 40. The voice coil 42 is held at the center of a magnetic gap by the damper 46, the diaphragm 20, and the edge 22 such that the voice coil 42 does not come into contact with the magnetic circuit 44 that forms the magnetic gap. The magnetic gap is a magnetic concentration point where a driving force is generated when current flows through the voice coil 42, and the voice coil 42 is placed in this void.

The diaphragm 20 is joined to the voice coil bobbin 40 in the opening 12 of the frame 10. The diaphragm 20 vibrates in accordance with the voice coil bobbin 40 and the voice coil 42, and emits sound as a sound wave into the air by vibrating the air. The edge 22 has an annular shape, and the inner peripheral side is joined to the outer peripheral portion of the diaphragm 20, and the outer peripheral side is joined to the frame 10. The edge 22 has flexibility that allows the diaphragm 20 to oscillate along the central axis. The edge 22 is, for example, made of rubber. The diaphragm 20 and the voice coil 42 may be grouped together as a vibration unit.

The terminal plate 30 is provided in the frame 10 and wiring between the amplifier (not shown) and the terminal plate 30 is connected thereto. Further, the tinsel wire 50 is also connected to the terminal plate 30, and the tinsel wire 50 connects the terminal plate 30 and the voice coil 42. As a result, an audio signal from the amplifier flows through the terminal plate 30 and the tinsel wire 50 to the voice coil 42.

Figure 2B:
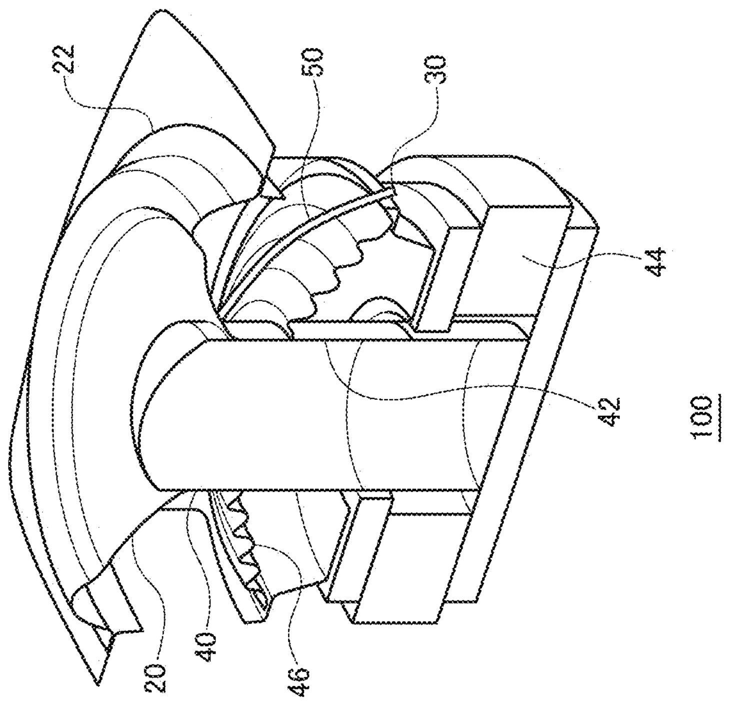
FIGS. 2A to 2B are cross-sectional perspective views showing the structure of the speaker of FIG. 1 during a downward stroke and during an upward stroke.
Figure 2A:
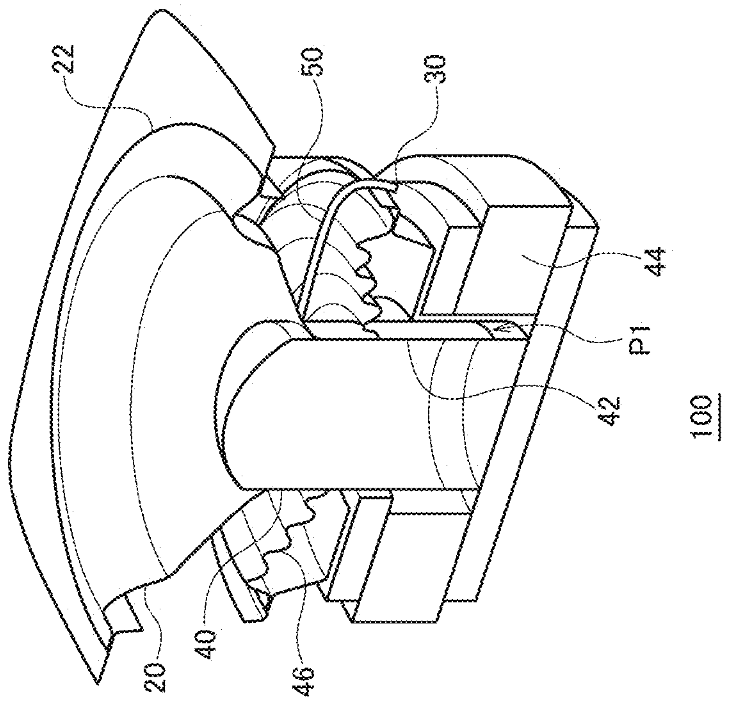

FIGS. 2A to 2B are cross-sectional perspective views showing the structure of the speaker 100 during a downward stroke and during an upward stroke. FIG. 2A shows the structure of the speaker 100 during normal input and downward stroke. The normal input refers to a case where a current within a current range predetermined as a current value that the speaker 100 can tolerate is input to the voice coil 42 via the tinsel wire 50. The downward stroke indicates a case where the voice coil 42 that can move in the vertical direction is moving to the lower side. In this situation, the magnetic circuit 44 is designed at a position where the magnetic circuit 44 does not come into contact with the bottom end of the voice coil 42. Further, the tinsel wire 50 is designed to have a length that does not come into contact with the diaphragm 20 and the damper 46 during vertical oscillation.

FIG. 2B shows the structure of the speaker 100 during excessive input and upward stroke. Excessive input refers to a case where excessive current exceeding the predetermined current range is input to the voice coil 42 via the tinsel wire 50. The upward stroke indicates a case where the voice coil 42 that can move in the vertical direction is moving to the upper side. In this situation, the voice coil 42 has moved upward beyond the expected amplitude range, and as a result, the tinsel wire 50 may become taut first. When the voice coil 42 to which the tinsel wire 50 is connected is pulled to the terminal plate 30 side by the tautening of the tinsel wire 50 such that the voice coil 42 is tilted in the magnetic gap, the voice coil 42 cannot be correctly positioned in the center of the magnetic gap and ends up vibrating while being in contact with the magnetic circuit 44 on both sides of the magnetic gap, thus damaging the voice coil 42 and the magnetic circuit 44. Further, by repeating vibration in a state where the tinsel wire 50 is being taut, the tinsel wire 50 may be broken or damaged.

Figure 3:
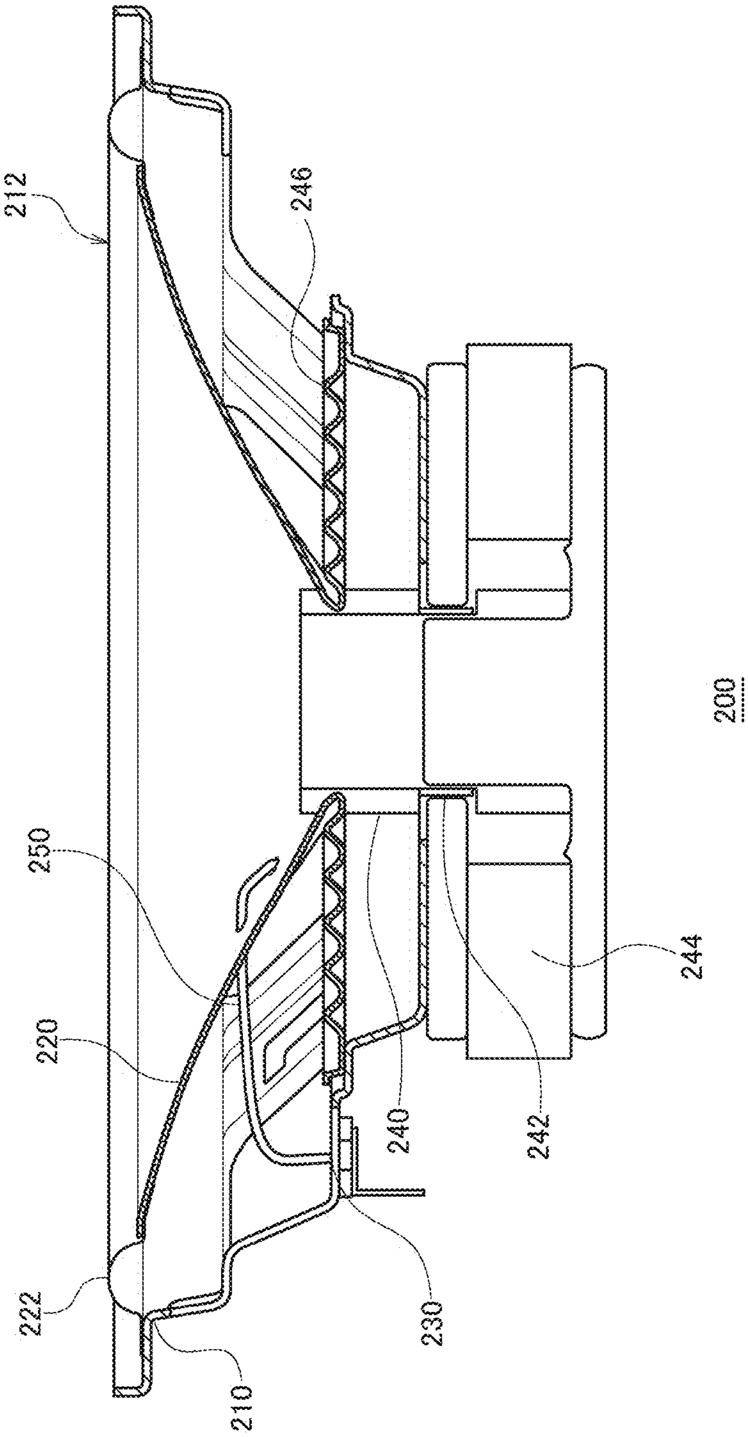
FIG. 3 is a cross-sectional view showing the structure of a speaker according to the present exemplary embodiment when there is no input.

FIG. 3 is a cross-sectional view showing the structure of a speaker 200 according to the present exemplary embodiment when there is no input. The speaker 200 includes a frame 210, a diaphragm 220, an edge 222, a terminal plate 230, a voice coil bobbin 240, a voice coil 242, a magnetic circuit 244, a damper 246, and a tinsel wire 250. The frame 210, the opening 212, the diaphragm 220, the edge 222, the voice coil bobbin 240, the voice coil 242, the magnetic circuit 244, and the damper 246 are identical to the frame 10, the opening 12, the diaphragm 20, the edge 22, the voice coil bobbin 40, the voice coil 42, the magnetic circuit 44, and the damper 46. Therefore, the explanation thereof will be omitted.

Figure 4:
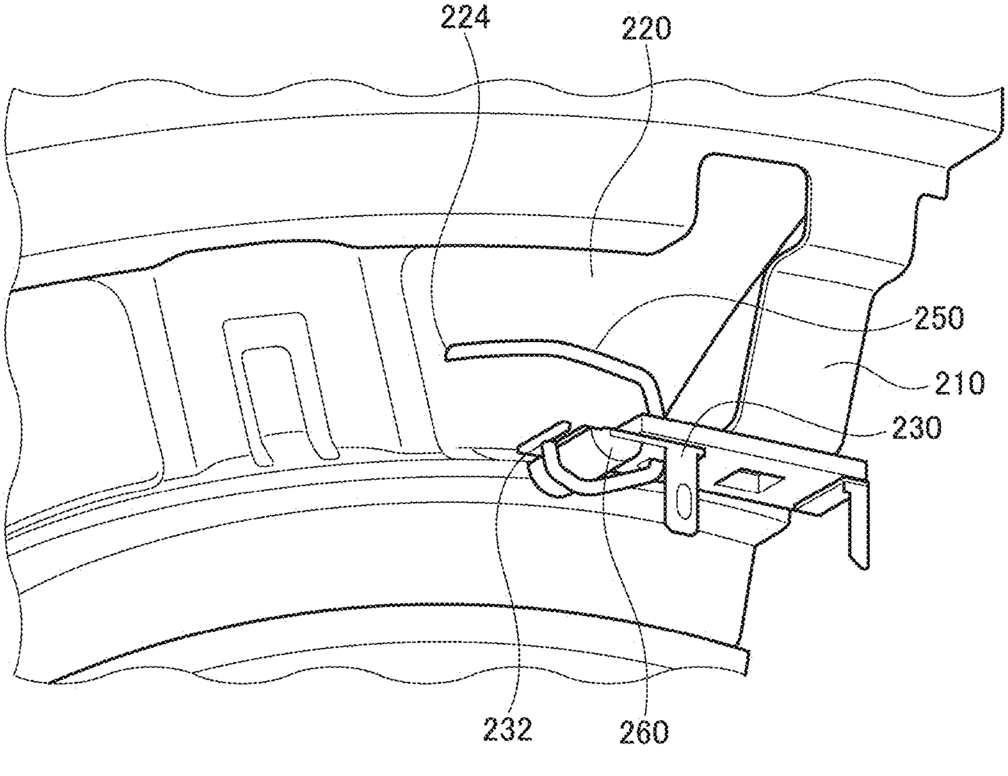
FIG. 4 is a partial perspective view showing the structure of the speaker of FIG. 3 when there is no input.

FIG. 4 is a partial perspective view showing the structure of the speaker 200 when there is no input. This is an enlarged view of the surrounding area of the terminal plate 230 of FIG. 3. The terminal plate 230 is provided in the frame 210. The tinsel wire 250 is connected to a connection terminal 232 in the terminal plate 230. The tinsel wire 250 passes through a through hole 224 provided in the diaphragm 220 and is also connected to the voice coil 242 (not shown). The terminal plate 230 is provided with, for example, an elastic member 260 having a semicylindrical shape adjacent to the connection terminal 232. The shape of the elastic member 260 is not limited, and may be a cylindrical shape, a square prism shape, or a spherical shape. The position at which the elastic member 260 is placed is around the tinsel wire 250 connecting the terminal plate 230 and the voice coil 242 and within a range where the tinsel wire 250 is displaced when the voice coil 242 moves upward beyond the expected amplitude range. The flat portion of the elastic member 260 is connected to the terminal plate 230, and the arc portion of the elastic member 260 faces opposite to the terminal plate 230. The tinsel wire 250 connected to the connection terminal 232 makes a detour along the arc portion of the elastic member 260 and then reaches the through hole 224. By this detour, the substantial length of the tinsel wire 250 is shortened. The elastic member 260 is preferably set at a position where the elastic member 260 does not come into contact with the tinsel wire 250 when current in a predetermined current range is being input to the voice coil 242 via the tinsel wire 250, in other words, when the amplitude of the vibration system including the voice coil bobbin 240 and the voice coil 242 is within an expected range and the styling of the tinsel wire 250 is maintained. Further, the elastic member 260 is formed of an elastic material such as a resin, for example.

Figure 5:
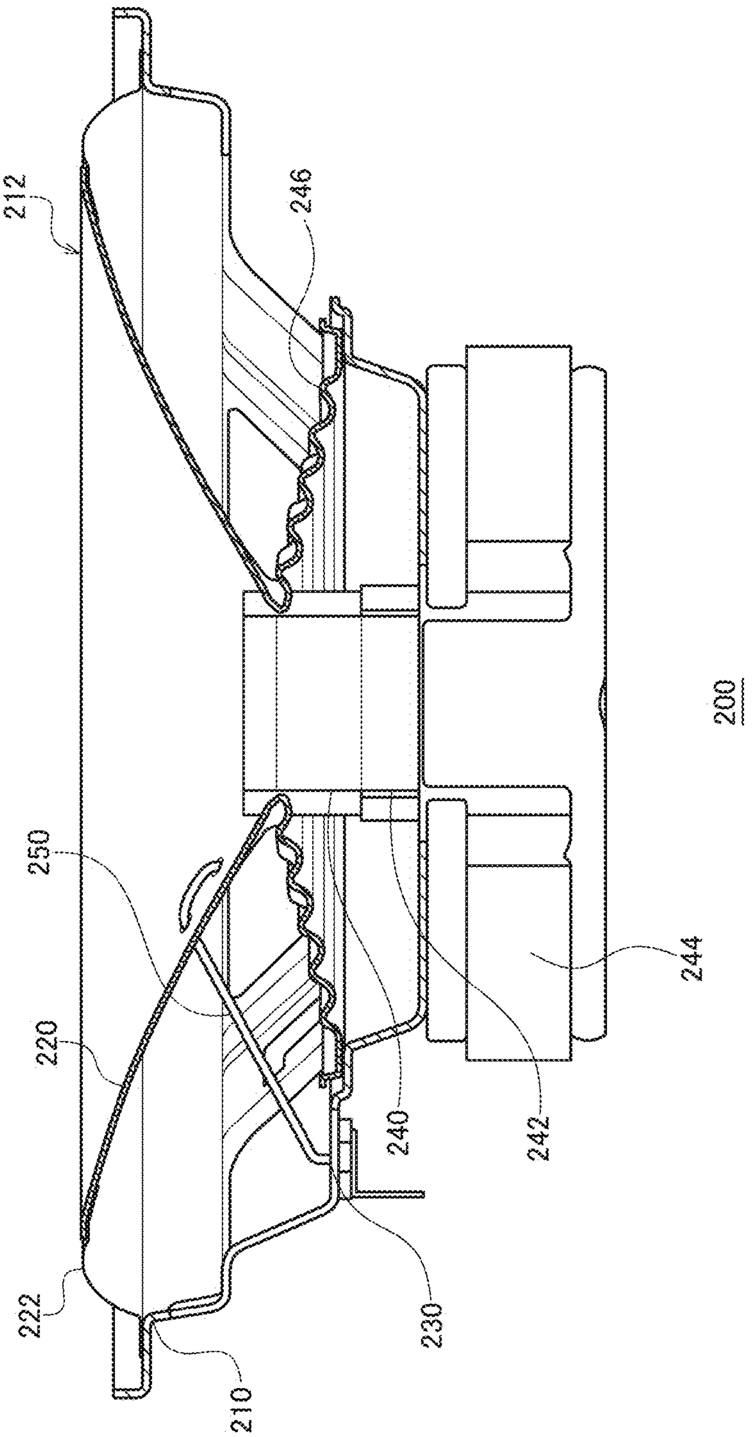
FIG. 5 is a cross-sectional view showing the structure during an upward stroke of the speaker according to the present exemplary embodiment.
Figure 6:
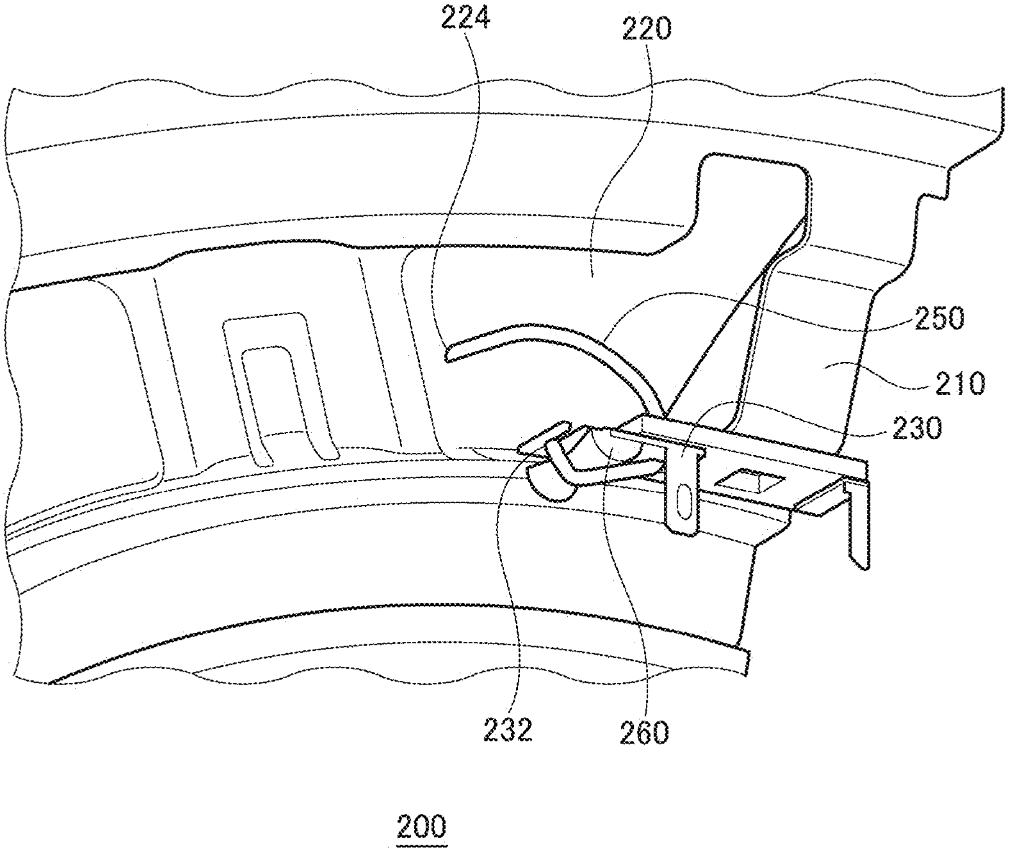
FIG. 6 is a partial perspective view showing the structure during an upward stroke of the speaker according to the present exemplary embodiment.

FIG. 5 is a cross-sectional view showing a structure during the upward stroke of the speaker 200 when excessive current exceeding the predetermined current range is input to the voice coil 242 via the tinsel wire 250. FIG. 6 is a partial perspective view showing the structure of the speaker 200 during the upward stroke. During the upward stroke, the voice coil 242 moves toward the upper side. When excessive current exceeding the predetermined current range is input to the voice coil 242 via the tinsel wire 250, the voice coil 242 moves upward with a greater amplitude compared to when current in the predetermined current range is input. As a result of the movement of the voice coil 242, a force toward the upper side is applied to the tinsel wire 250 due to tautening. In the present exemplary embodiment, this force is referred to as a movement stress. At that time, as shown in FIG. 6, the tinsel wire 250 abuts on with the elastic member 260, and the elastic member 260 is crushed by the movement stress at the tinsel wire 250, and the diameter is thus shortened. As a result, the tautening of the tinsel wire 250 is lessened by substantially lengthening the tinsel wire 250. The elastic member 260 is set at a position where the elastic member 260 becomes deformed being crushed by the movement stress generated at the tinsel wire 250 in response to the vibration of the voice coil 242 when excessive current exceeding the predetermined current range is input to the voice coil 242 via the tinsel wire 250 and the voice coil 242 moves in the sound emission direction. In other words, the elastic member 260 is placed at a position and in a direction where the elastic member 260 becomes deformed being crushed by the tinsel wire 250 when the voice coil 242 moves in the sound emission direction by an amount equal to or greater than an expected amplitude.

A case will be explained where excessive current exceeding the predetermined current range is input to the voice coil 242 via the tinsel wire 250 such that the voice coil 242 moves in the opposite direction to the sound emission direction, that is, a downward direction. At this time, since the damper 246 abuts on the magnetic circuit 244 restricting the stroke, it is not necessary to reduce the tautening of the tinsel wire 250 through the deformation of the elastic member 260. That is, the position where the elastic member 260 is placed needs to be a position where the elastic member 260 deforms when excessive current exceeding the predetermined current range is input to the voice coil 242 via the tinsel wire 250 and the voice coil 242 moves in the sound emission direction.

According to the present exemplary embodiment, since the elastic member 260 becomes deformed due to the movement stress generated at the tinsel wire 250 in response to the vibration of the voice coil 242, the substantial length of the tinsel wire 250 can be increased. Further, since the substantial length of the tinsel wire 250 is increased, the stress applied to the voice coil 242 can be reduced. Also, by reducing the stress applied to the voice coil 242, it is possible to suppress the voice coil from being pulled and tilted, and damage to the voice coil 242 can be suppressed. Further, since the damage of the voice coil 242 is suppressed, damage to the speaker 200 can be suppressed even when excessive current exceeding the maximum input is input.

Further, since the elastic member 260 is set at a position where the elastic member 260 becomes deformed due to the movement stress generated at the tinsel wire 250 in response to the vibration of the voice coil 242 when excessive current exceeding the predetermined current range is input to the voice coil 242 via the tinsel wire 250 and the voice coil 242 moves in the sound emission direction, the elastic member 260 can be deformed. Also, since the elastic member 260 is set at a position where the elastic member 260 does not come into contact with the tinsel wire 250 when current in the predetermined current range is being input to the voice coil 242 via the tinsel wire 250, the elastic member 260 can be prevented from being deformed. Since the elastic member 260 is not deformed, the proper design length of the tinsel wire 250 can be maintained.

Described above is an explanation on the present disclosure based on the exemplary embodiment. This exemplary embodiment is intended to be illustrative only, and it will be obvious to those skilled in the art that various modifications to constituting elements and processes could be developed and that such modifications are also within the scope of the present disclosure.

What is claimed is:

1. A speaker comprising:

a terminal plate;

a vibration unit that includes a voice coil and a diaphragm;

a tinsel wire that connects the diaphragm and the voice coil; and an elastic member that is placed at a position where the elastic member becomes deformed due to movement stress generated at the tinsel wire in response to vibration of the vibration unit when excessive current exceeding a predetermined current range is input to the voice coil via the tinsel wire, wherein the elastic member becomes deformed due to the movement stress generated at the tinsel wire in response to the vibration of the vibration unit.

2. The speaker according to claim 1, wherein the elastic member is further set at a position where the elastic member becomes deformed due to the movement stress generated at the tinsel wire in response to the vibration of the vibration unit when the vibration unit moves in a sound emission direction.

3. The speaker according to claim 2, wherein the elastic member is set at a position where the elastic member does not come into contact with the tinsel wire when current in the predetermined current range is being input to the voice coil via the tinsel wire.

4. The speaker according to claim 1, wherein the elastic member is set at a position where the elastic member does not come into contact with the tinsel wire when current in the predetermined current range is being input to the voice coil via the tinsel wire.

* * * * *